March 1, 1966     E. M. BERLY     3,237,382

ELECTROSTATIC PRECIPITATOR

Filed Nov. 9, 1961     3 Sheets-Sheet 1

INVENTOR.
Edward M. Berly
BY Morse & Altman

ATTORNEYS

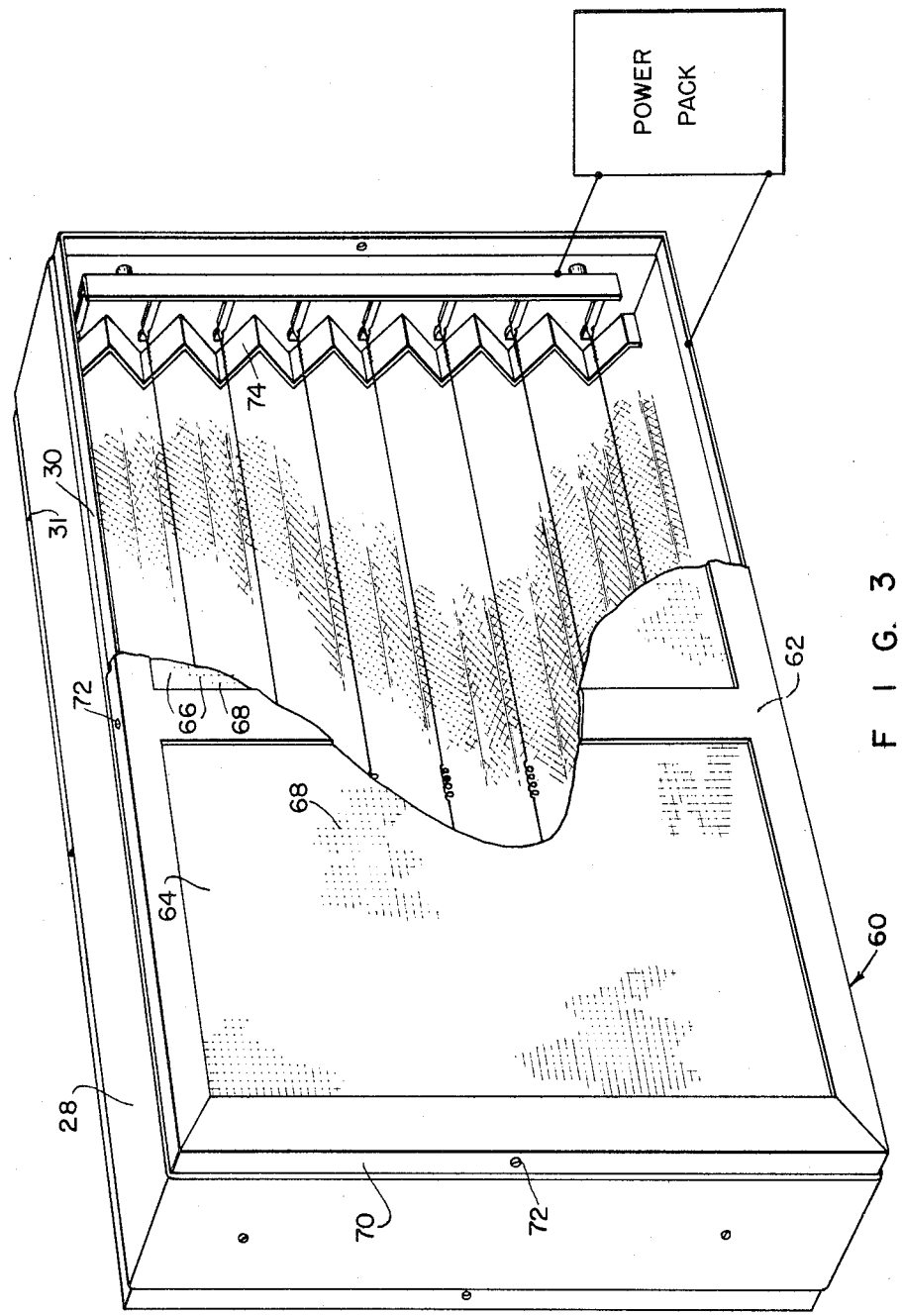

March 1, 1966  E. M. BERLY  3,237,382
ELECTROSTATIC PRECIPITATOR
Filed Nov. 9, 1961  3 Sheets-Sheet 3

INVENTOR.
Edward M. Berly
BY Morse & Altman
ATTORNEYS

United States Patent Office 3,237,382
Patented Mar. 1, 1966

3,237,382
ELECTROSTATIC PRECIPITATOR
Edward M. Berly, Newton Highlands, Mass., assignor to Precipitator Corporation of America, Boston, Mass., a corporation of Massachusetts
Filed Nov. 9, 1961, Ser. No. 151,327
1 Claim. (Cl. 55—132)

The present invention relates to air cleaning, and more particularly, air cleaning by both filtration and electrostatic precipitation. In filtration impinging dust particles are caught mechanically by relatively large area fibers or the like. In electrostatic precipitation air molecules, charged by a first electrostatic force, accumulate on dust particles that in consequence become charged, and the charged dust particles, under the direction of a second electrostatic force, are deposited on relatively small area electrode configurations. The present invention contemplates a novel air cleaner having, by virtue of a novel combination of filtration and electrostatic precipitation, an unusually low pressure drop and a remarkably simple design that reduces component and fabrication costs and minimizes electrical and mechanical failure.

Primary objects of the present invention are to provide an air cleaner of the foregoing type characterized by: inertial collection as by means of a filter and electrostatic collection as by means of a charged ionizer and precipitator, both provided by a particular arrangement of an array of high voltage ionizing wires and a grounded conducting mesh provided with an array of convolutions; and physical dimensions extending within a region of substantial lateral extent but minimal axial extent by virtue of the configurations of the foregoing elements.

Other objects of the present invention will in part be obvious and will in part appear hereinafter.

The invention accordingly comprises the apparatus possessing the features, properties and the relation of components, which are exemplified in the following detailed disclosure, and the scope of which will be indicated in the appended claim.

For a fuller understanding of the nature and objects of the present invention, reference should be had to the following detailed description, taken in connection with the accompanying drawings wherein:

FIG. 1 is a schematic side view, partly broken-away and partly in cross-section, of a system incorporating a component embodying the present invention;

FIGS. 2(a), (b) and (c) illustrate modifications of an element of the component of FIG. 1;

FIG. 3 is an isometric view of the component of FIG. 1 in enlarged detail;

Figure 1:
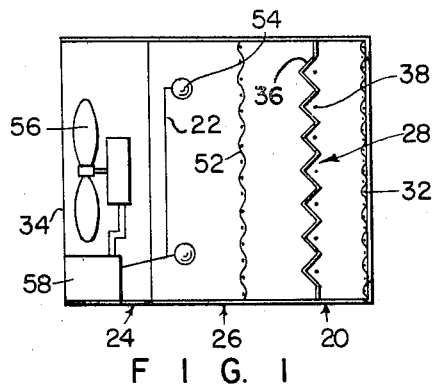

Generally, the combination of FIG. 1 includes an ionizing and collecting component 20, a germicidal component 22 and an exhaust component 24. The elements of germicidal component 22 and exhaust component 24 are supported by and enclosed within a sheet metal conduit 26. The elements of ionizing and collecting component 20 are supported by and enclosed within sheet metal conduit 28, the rearward and forward edge portions of which are slightly indented as at 30 and 31 to provide seats for a cover and for the forward edge portions of conduit 26. In accordance with the present invention, conduit 28 is open at its forward end 32 and conduit 26 is open at its rearward end 34 in order to permit air to be cleaned to be drawn through the conduits.

Figure 2:
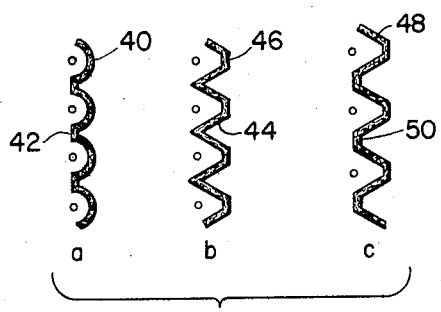

The components within conduit 28 include a convoluted metallic mesh 36, of large effective area because of its fibrous character, having an array of pleats and an array of ionizing wires 38. Each ionizing wire 38 is approximately equidistant from increments of the faces of the pleat with which it is associated. As shown in FIG. 1, ionizing wires 38 are disposed in the plane that includes the forward apices of the pleats of mesh 36. Although it is of course recognized that an ionizing wire at the center of a semicircular convolution of mesh would be exactly equally spaced from all increments of the convolution, it has been found that the foregoing arrange-approximation to the ideal. Alternative forms of the ionizing wire and collecting mesh combination are shown in (FIGS. 2(a), (b), and (c). In FIG. 2(a), the convolutions include semicircular troughs 40 joined by flat sections 42. In FIG. 2(b), the convolutions include V-shaped ridges 44 joined by flat sections 46. In FIG. 2(c), the convolutions include frustro-V-shaped ridges 48 joined by flat sections 50.

In order to ensure efficient collection, an auxiliary mesh 52 is provided at the rearward opening of conduit 28. Forwardly within conduit 26 are a pair of germicidal lamps 54 which, when suitably energized, emit ultraviolet radiation of a type having bactericidal characteristics. Rearwardly within conduit 26 is a suitable fan 56. All of the foregoing elements are energized by a suitable power supply 58 within conduit 26. It will be appreciated that component 20 may be used in a variety of applications other than in the system of FIG. 1, which might be used as a portable home air cleaner. Such applications include use in central heating and cooling systems, central ventilating systems, industrial air cleaning systems, etc. Because this component is light, it can be removed from its intended position, washed and returned to its intended position. This component in appearance and shape is similar to a mechanical filter which can be handled without difficulty.

The specific design of component 20 is shown in detail in FIGS. 3 to 7. Conduit 20 is shown as being from 3 to 10 times as wide or as high as it is in depth. As indicated above, its forward and rearward edges 30 and 31 are indented in order to permit either a conduit or a cover to receive the edges associated with it. A suitable cover is shown at 60 as including a frame having a face 62 with two apertures 64 and 66, both covered by screening 68. The rim 70 of frame 60 receives indented portions 30 of conduit 20 and is fastened thereto by suitable nut and bolt combinations 72. It will be understood that either a conduit of the type shown at 26 in FIG. 1 or a cover of the type shown at 60 in FIG. 3 can be fitted to the rearward edge 31 of the conduit shown in FIG. 3.

Figure 4:
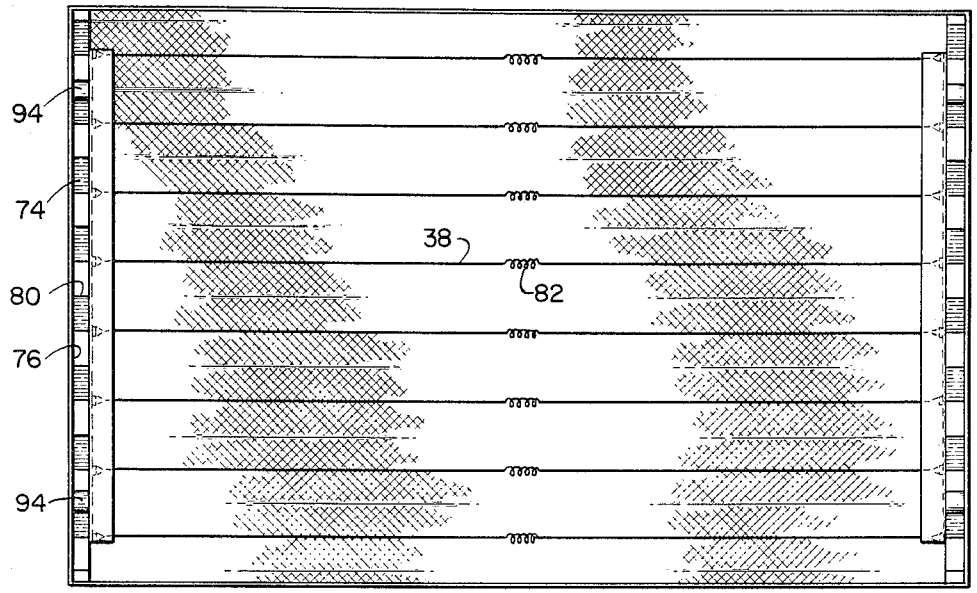
FIG. 4 is a front elevation of the component of FIG. 3 with its front cover removed.
Figure 5:
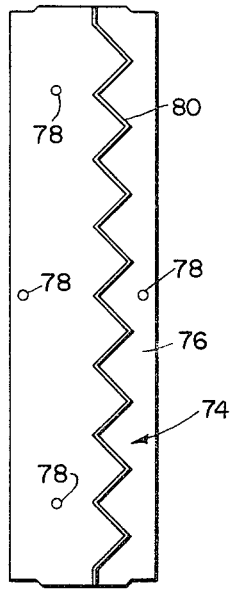
FIG. 5 is a detail view of an element of the component of FIG. 3.
Figure 6:
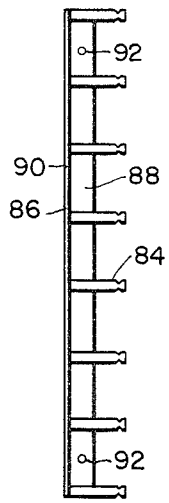
FIG. 6 is a detail view of another element of the component of FIG. 3.

As shown in FIGS. 4 and 5, metallic mesh 36 is supported and its shape is maintained by a pair of mounts which are mirror images of each other and are mounted at analogous positions at opposite panels of conduit 20. One of these mounts is shown at 74 in FIGS. 3, 4 and 5. This mount includes a base plate 76 provided with suitable mounting holes 78 and, extending perpendicularly from the base thereof, a convoluted sheet metal shape 80. Sheet metal shape 80 includes in continuous sequence increments which are disposed in planes angularly with respect to each other and at right angles with respect to the plane of base plate 76. It will be apparent that shapes 80 at opposite edges of conduit 20 are capable of supporting a metallic mesh of the same cross-sectional configuration and ensuring the retention of its desired shape.

Ionizing wires 38, each of which has along its length at least a single coiled spring 82, are supported at their ends by a plurality of fingers 84 which are mounted as follows. Each of fingers 84 is an extension of a sheet metal bracket 86 having a pair of right angle faces 88 and 90. Right angle face 88 is supported as by means of holes 92 on insulators 94 away from conduit 20. It will be observed that face 86 serves to appropriately space fingers 84 from the remaining conducting components of the system.

Figure 7:
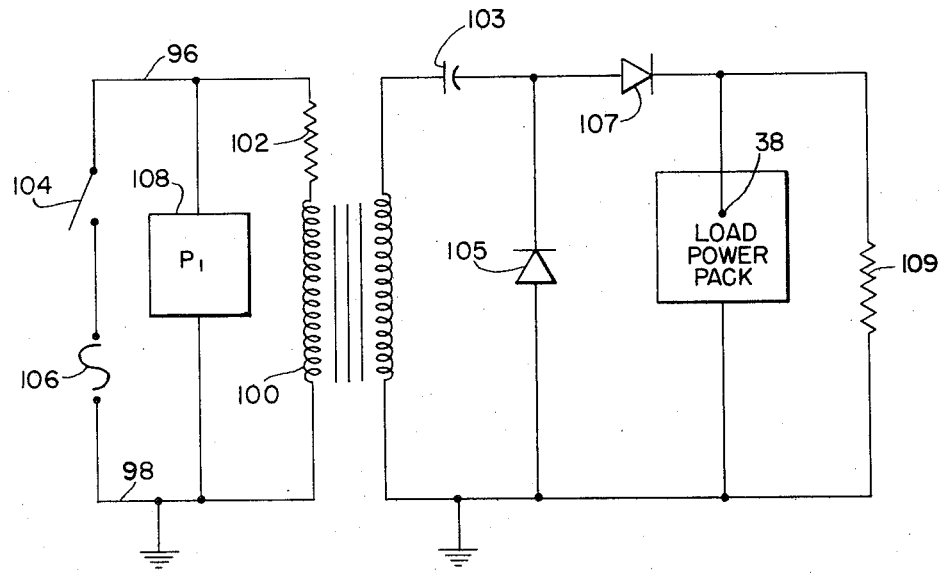
FIG. 7 is an electrical schematic diagram of the power supply for the component of FIG. 3.

The electrical supply and control system is shown in FIG. 7. Alternating current is applied through a pair of input leads 96, 98 which energize the primary of a transformer 100 through a limiting resistor 102. A switch 104, fuse 106 and pilot light 108 are provided. The secondary of transformer 100 is applied across a capacitor 103 and a selenium rectifier 105. The resulting voltage, which is unidirectional by virtue of the directivity of selenium rectifier 105, is applied through selenium rectifier 107 across ionizing wires 38 and ground. Resistor 109 serves as a high resistance bleed off for discharging the capacitor when the unit is shut off.

In operation, therefore, component 20 combines inertial impingement with electrostatic attraction generated between the wire and the mesh. The air stream is directed perpendicularly to the collection surfaces in consequence of which the dust particles are forced very close to the collection surfaces by virtue of the fact that the air and dust particles are passed through the mesh. Therefore the distance that must be travelled by a particle from its normal streamline to the collecting surface is necessarily small although the residence time is not very great. However, the combined effect of inertial and electrostatic forces provide a powerful effect for depositing dust particles on the surfaces in all particle ranges. Where very heavy dust loads are concerned, particularly where a large fraction of the particles are larger than five microns in overall extent, due to the combined inertial and electrical effects, a minimum amount of ionization would be required to accomplish the collection. This equipment may be designed to operate throughout a very wide range of voltages depending upon the application, i.e. air or gas loaded with varying concentrations of dust, particle size, dielectric properties, etc. This equipment may operate in voltage ranges anywhere from 1000 volts to 100,000 volts. The conductive mesh may be expanded metal or metallic cloth, woven or nonwoven.

The present invention thus provides a high capacity, low cost electrostatic precipitator which may be simply handled by non-technical personnel by virtue of the simplicity of installation of the panel. Since certain changes may be made in the above apparatus without departing from the scope of the invention herein involved, it is intended that all matter contained in the above description or shown in the accompanying drawings shall be interpreted in an illustrative and not in a limiting sense.

What is claimed is:

An electrostatic precipitator comprising a housing in the form of a tubular conduit extending along an axis and being rectangular in cross-section perpendicular to said axis, said conduit having an inlet end and an outlet end, a convoluted conducting mesh means within said conduit and forming a plurality of substantially parallel convolutions for collecting particles from gas passing through said precipitator, said mesh means at all points of its periphery engaging the inner surface of said conduit so that all gas passing through said conduit from said inlet end to said outlet end must pass through said mesh means, a plurality of wires at elevated voltage within said conduit, said wires being substantially parallel to each other and lying substantially entirely in a plane transverse to said axis, all of said plurality of wires disposed between said inlet end of said conduit and said mesh means, each convolution of the upstream side of said mesh means having only one of said plurality of wires disposed therein, each one of said wires being substantially equidistant from substantially all of the increments of its associated convolution, a pair of convoluted support elements at opposite sides of said housing, each of said convoluted support elements projecting from said sides of said housing substantially perpendicularly with respect thereto, the cross-sectional shape of each of said convoluted supporting elements corresponding to the cross-sectional shape of said mesh, the extremities of said mesh being connected to said convoluted elements in such a way as to be substantially congruent therewith, a pair of wire mounts at said opposite sides of said housing, each of said wire mounts including a plurality of fingers, said fingers being disposed in a plane spaced from one of said opposite sides of said housing, each of said wire mounts including a bracket connecting and supporting said plurality of fingers of said each of said wire mounts, said wire mounts and said fingers being composed of conducting metal, said convoluted support elements being composed of conducting metal, said wires being composed of conducting metal, a frame composed of metal constituting part of said housing, said convoluted elements being mechanically and electrically connected to said frame, insulating spacers on said frame, said brackets being mechanically connected to said insulating spacers, each of said wires having a coil spring between the fingers at opposite ends of said wires, said coil springs tensioning said wires, a power supply including a pair of input leads, a transformer having a primary and a secondary, means for applying alternating current power to said primary through said leads, a capacitor and a first rectifier in series across said secondary, a second rectifier connected from between said first rectifier and said capacitor to said brackets, said frame being grounded, a fan within said housing and between said mesh means and said outlet end of said conduit for drawing air first through said wires and then through said mesh and a germicidal lamp between said fan and said mesh.

References Cited by the Examiner

UNITED STATES PATENTS

| | | | |
|---|---|---|---|
| 1,220,888 | 3/1917 | Porter | 55—500 X |
| 2,080,242 | 5/1937 | Ward | 55—131 X |
| 2,326,237 | 8/1943 | Lissman | 55—139 |
| 2,343,338 | 3/1944 | Steel | 55—107 X |
| 2,489,786 | 11/1949 | Klemparer | 55—139 X |
| 2,549,782 | 4/1951 | Engelman | 55—105 X |
| 2,588,111 | 3/1952 | Hanneman | 55—132 |
| 2,626,008 | 1/1953 | Barr | 55—154 X |
| 2,634,818 | 4/1953 | Wintermute | 55—136 X |
| 2,638,644 | 5/1953 | Rauhut | 55—279 X |
| 2,665,770 | 1/1954 | Richardson | 55—145 X |
| 2,708,488 | 5/1955 | Larsson | 55—151 |
| 2,735,509 | 2/1956 | Fields | 55—142 X |
| 2,814,355 | 11/1957 | Powers | 55—154 X |
| 2,852,093 | 9/1958 | Streuber | 55—147 X |
| 2,870,861 | 1/1959 | Valvo et al. | 55—147 X |
| 3,066,463 | 12/1962 | Penney | 55—139 |

FOREIGN PATENTS

| | | |
|---|---|---|
| 664,255 | 1/1952 | Great Britain. |
| 691,341 | 5/1953 | Great Britain. |
| 520,183 | 3/1955 | Italy. |

HARRY B. THORNTON, *Primary Examiner*.

CHARLES SUKALO, *Examiner*.